April 13, 1965          F. JOCHIM          3,178,085

CUTTING GLASS

Filed Sept. 24, 1962                        2 Sheets-Sheet 1

INVENTOR.
FRIEDRICH JOCHIM
BY
Bauer and Seymour
ATTORNEYS

April 13, 1965  F. JOCHIM  3,178,085
CUTTING GLASS

Filed Sept. 24, 1962  2 Sheets-Sheet 2

INVENTOR.
FRIEDRICH JOCHIM
BY
Bauer and Seymour
ATTORNEYS

United States Patent Office 3,178,085
Patented Apr. 13, 1965

3,178,085
CUTTING GLASS
Friedrich Jochim, Herzogenrath, Germany, assignor to Compagnie de Saint-Gobain, Neuilly-sur-Seine, France
Filed Sept. 24, 1962, Ser. No. 225,608
Claims priority, application France, Sept. 25, 1961, 874,069
10 Claims. (Cl. 225—2)

This invention relates to the cutting of glass and similar frangible materials, particularly to the cutting of flat glass, and especially to the cutting of glass sheets into complex shapes which are scored on the glass following a pattern, cutting being completed by breaking the glass along the line of the score.

In most cases the cutting of glass is executed by hand. This has been mechanized, particularly in the continuous production of glass, by locating rollers below the scoring apparatus which alternately puts the sheet under compression and tension, glass usually being compressed during scoring and tensioned at the moment of rupture.

That process is satisfactory particularly in removing the edges of a continuous sheet after its manufacture, but it has the difficulty that when it is applied to closed curves it introduces a torsion or wedging strains into the sheet which distorts the line of rupture and generates scales. This difficulty is particularly important when it concerns the manufacture of shapes in their ultimate sizes, for instance in the cutting out of a sheet of glass a piece which is the shape of a windshield and is to be mounted without further trimming, or in the case of glass which is to be tempered. In the latter case it is known that the scales constitute the starting points of ruptures, which requires that the scales be ground away before the tempering. It has the additional disadvantage that the edges are not always square and have to be restored by milling.

It is an object of the invention to improve the cutting of glass, particularly the cutting of glass in curved lines and particularly to assure the removal of perfect pieces from within the borders of larger pieces of glass. Another object is to reduce the wastage of glass which accompanies the removal of shapes from within blanks. It is another object to devise an apparatus for completing by rupture the cutting of a scored sheet of glass.

The objects of the invention are accomplished, generally speaking, by the method of cutting glass or the like which comprises scoring the surface of the glass and pressing the glass between oppositely directed forces of which one is applied along the line of the score and the other is applied on both sides adjacent the line of the score but in positions laterally offset therefrom, and by an apparatus for completing the rupture of scored glass or the like which comprises a land aligned with the score, oppositely directed lands offset from the score, and means to press the lands against the glass.

In carrying out the present invention the glass is scored, for example by a diamond or a scoring wheel and placed on a support of narrow width, for instance of a width on the order of the thickness of the sheet, which follows the scored line, there being applied to the sheet oppositely directed forces which are located on opposite sides of the plane which passes through the score perpendicularly to the glass sheet.

There is thus generated throughout the length of the score a tractive effort which excludes any torsion, scissoring of wedging effect which would interfere with the formation of a truly vertical break or which would generate scales.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, FIG. 1 is a vertical elevational view, partly in section, of an apparatus for carrying out the process;

Figure 1:
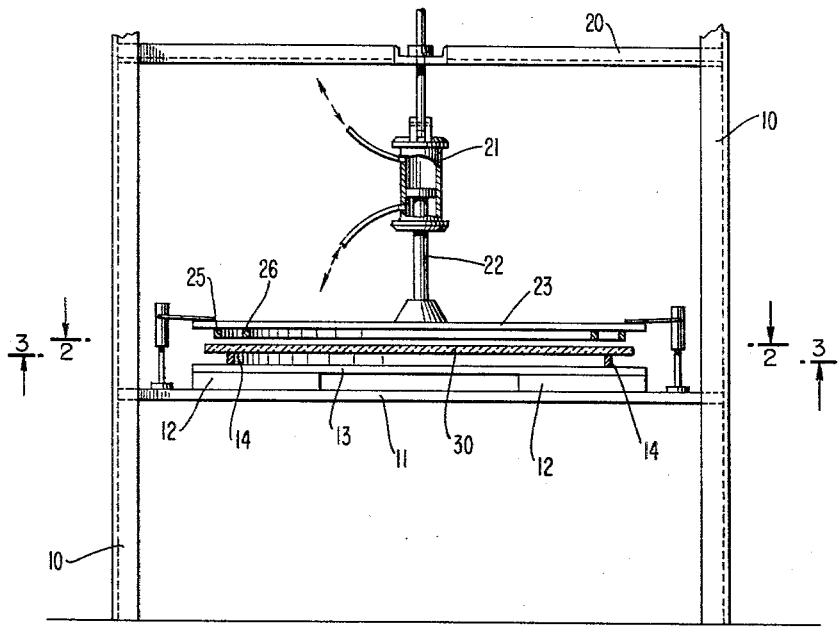
Figure 2:
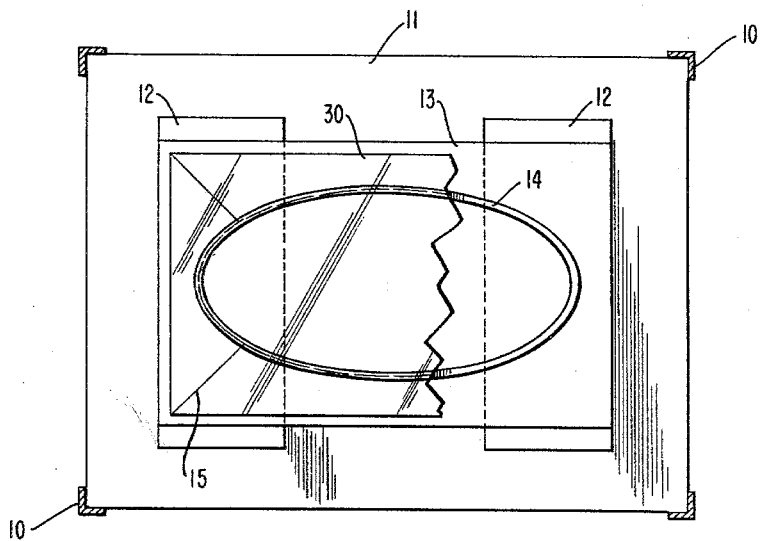
FIGS. 2 and 3 are, respectively, plan views of the upper and lower plates of the apparatus of FIG. 1.
Figure 3:
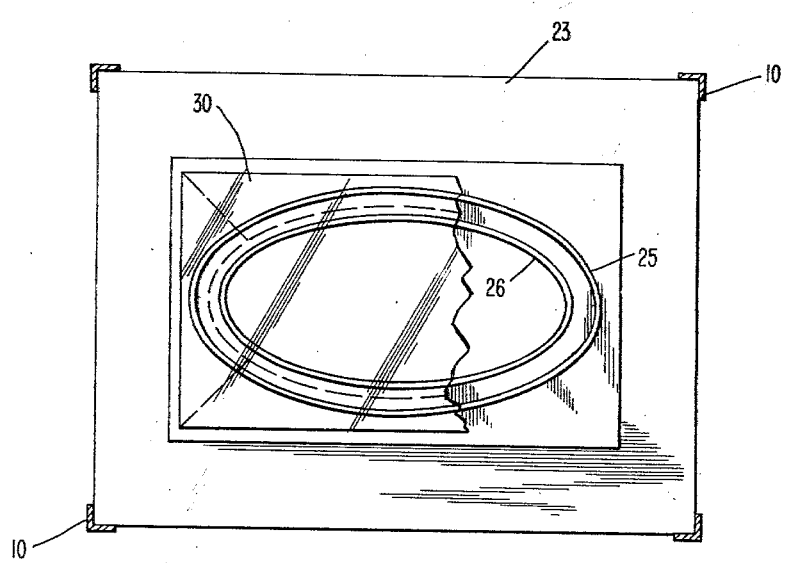

As shown in FIGS. 1, 2, and 3 a frame 10 supports a floor or base 11 upon which is mounted two supports 12, 12 which, in turn, carry the lower die or breaking plate 13 on the surface of which is an oval land 14. The land has an upper bearing surface which lies in a single plane, extends from perhaps 1 cm. above the plate 13 and is about as wide as the thickness of a sheet of flat glass. In the operation of the device the land is formed to substantially the same shape and size of the line which is scored in the glass, for instance by drawing a diamond along the edge of a pattern. The scored line of the glass is indicated in dashes on FIG. 2. The scored lines 15 which extend to the corners of the glass are to facilitate the removal of the parts of the blank which are discarded and to prevent the setting up of irregular strains during breaking.

The frame 10 carries a cross member 20 which supports a manually or automatically operable pressure cylinder 21 operable for instance by compressed air, the piston of which is attached to a piston rod 22 which carries an upper dies or breaking plate 23, the lower operative face of which carries a double line of lands 25, 26 which are located, respectively, outside and inside the plane of the score.

The sheet of glass 30 rests upon the lands of the lower plate 13, in the operation of the device, the scored lines being superimposed upon the lands. The upper piston is now thrust down until it engages the glass plate and is then applied with sufficient force to break the plate cleanly along the line of the score.

The land may be of a few mm. in width, for instance 6 mm. in the case of a glass plate 5 mm. thick. The lands may be composed of a material which is strong enough but does not cause the deterioration of the glass. Plywood is satisfactory. Because the support has substantial thickness compared to the width of the score the centering of the sheet on the land does not have to be exact, but it is desirable that the score should overlie the land. The upper lands may be composed of hard rubber or other durable pastics having a hardness on the order of 60 to 80 Shore. The lands are preferably provided with flat tops. The upper lands may be disposed a few mm. outside the vertical boundaries of the lower support. For example, the land 26 may be disposed about 5 mm. inside land 14 and land 25 may be disposed an equal distance outside of it. It is not necessary that the lands shall be continuous but they are generally continuous where they are curved. Continuity is less necessary where straight or slightly curved lines are involved. Wherever the fracture is free to propagate itself without difficulty along the score the presence of few guide lands is sufficient.

It is advantageous to register the apparatus so that the start of the fracture will begin at a single point, for example on a curve and propagate itself progressively thence. This can be accomplished by several means. One may slightly raise the lower support for instance 0.5 mm., so that the first engagement of the glass plate with the two pressers occurs at the desired point.

One may also reduce the height of the two upper lands at the points which are not to perform the first engagement. It is also possible to modify the distance of the two upper lands at the desired points in order to increase the tractive effort.

An important advantage of this invention is the ability to introduce it without difficulty into transfer machines to which it is particularly well adapted. It is also well adapted to incorporation in automatic cutting machines.

Another advantage is that it requires only a simple straight line movement of the piston and the upper die to accomplish the break which results in extreme rapidity of action especially on complex shapes.

Another advantage of the process is that the size of the blank from which the final shape is cut may be materially reduced. Tests have shown that one can use this apparatus even if the space between the score and the edge of the blank is only as wide as the thickness of the blank (for instance 5 mm.). This results in the use of smaller blanks and an appreciable saving of glass. Another advantage is that the trimming and milling of the edges of the glass, which were not always perfect in prior art devices, is greatly reduced or substantially eliminated.

Figure 4:
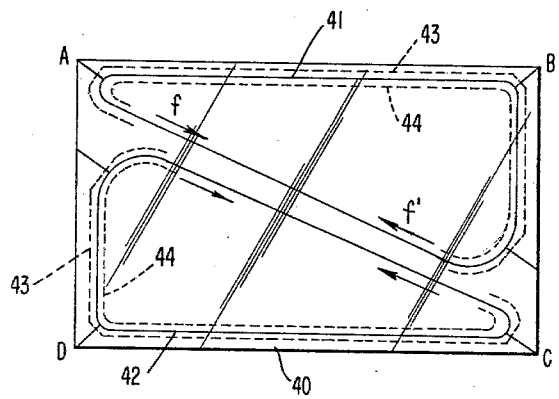
FIGURE 4 is a plan view of more complex apparatus.

Another advantage is that one may remove from a single blank in a single operation a plurality of final shapes. For example in cutting out the small glass sheets which are used in the dickey windows of automobiles two or more may be cut from a single blank as indicated in FIG. 4. In that figure the blank is indicated by the numeral 40 the scores by the lines 41, 42, which are presumed to overlie the lower support, and the center lines of the upper lands are indicated by the numerals 43, 44, respectively. It will be observed that these lands are not continuous being interrupted at the corners and allowed to propagate themselves in the direction of the arrows F, F' along straight lines. The diagonals or hypotenuse of the triangles may be quite close, for example on the order of 15 mm. To complete this rupture along the diagonals it suffices to elevate the lands about 0.5 mm. at the ends of the hypotenuses. This produces a satisfactory break even in the absence of lands in that region.

Another advantage of the invention is reduction in the time required for the operation and a great economy of glass. Furthermore, it is possible to choose a point or several points of departure for the breaking so that the breaking progresses from these points to its completion. In many glasses this is a preferred method of proceeding.

In general, it may be considered that any forms which may be approximately encircled by one of the ridges are capable of being cut by this process and may be removed from a blank in a single operation. One may naturally provide in different sides of the support all the mechanisms which are necessary to remove the detritus and waste glass of the operation.

As many apparently widely different embodiments of the present invention may be made without departing from the spirit and scope thereof, it is to be understood that the invention is not limited to the specific embodiments. In the claims the terms "upwardly," "lower," "over," etc. are for convenience in defining the invention as viewed upon the drawing and are not to be interpreted as limiting the method and apparatus to use in any particular position with respect to the vertical or the horizontal since, obviously, the invention may be carried out with the lands in inclined or vertical planes. Also as will be clear, the invention may be used with lands 25, 26 beneath, and land 14 above the sheet.

What is claimed is:

1. That method of severing a sheet of frangible material along a line of predetermined shape scored in a first face thereof, comprising, pressing said sheet between a first land in contact with the second face of the sheet and in coincidence with the line scored therein, and second and third coplanar parallel lands in contact with the first face of the sheet and spaced from and upon respectively opposite sides of the line scored therein, all said lands being substantially coextensive with the scored lines and engaging the sheet substantially simultaneously throughout the length of the line.

2. The method of severing a sheet of frangible material along a line scored in a first face thereof, comprising, abutting said sheet on the second face thereof simultaneously throughout and along a line directly opposite said scored line, while applying force to the first face of said sheet simultaneously along and throughout two lines parallel with and spaced upon opposite sides of said scored line, respectively.

3. The method of severing a horizontally-disposed sheet of glass along a closed line scored in the upper surface thereof, comprising, supporting said sheet simultaneously throughout and along a line parallel with and directly beneath said scored line only, while applying force to the upper surface of the sheet simultaneously downwardly, throughout and along two spaced lines each paralleling said scored line and spaced therefrom upon respectively opposite sides thereof.

4. The method of severing a sheet of glass along a line scored in a first face thereof, comprising applying a first force to the second face of the sheet simultaneously along and throughout a line parallel with and directly opposite the line scored therein, while applying a second force to said first face, in opposition to said first force, said second force being applied simultaneously throughout and along two lines each spaced the same small distance from and parallel with the scored line, upon respectively opposite sides thereof.

5. An apparatus for severing a sheet of frangible material along a line scored in one face thereof, comprising, a base, a first land mounted on said base and extending upwardly therefrom, said first land conforming in shape and scale to that of the scored line of the sheet, a plate, means mounting said plate over said base for translation toward and from the same, and second and third spaced parallel lands carried by said plate on the lower face thereof, said second and third lands being so constructed and arranged to lie parallel with and offset from said scored line upon respectively opposite sides therof, when said plate is translated toward said base to bring said second and third lands into contact with the sheet resting on said first land with its scored line in coincidence therewith, and means operable to force said base and plate together.

6. The apparatus of claim 5, said first land lying in a first plane, said second and third lands lying in a second plane, said planes being substantially parallel.

7. The apparatus of claim 5, said first land lying in a first plane, said second and third lands lying in a second plane inclined to said first plane at an angle of the order of a few degrees, whereby said second and third lands make initial contact with said sheet at a point on the scored line.

8. In an apparatus for severing a sheet of glass along a line of predetermined shape scored in a first face thereof, a base, a first land fixed with said base and conforming in shape, scale and extent to said scored line, a plate mounted over said base, and first land for movement toward and from said first land, second and third discrete parallel spaced lands carried by said plate, each conforming to the shape and extent of said scored line, said second and third lands being so constructed and arranged to engage said first face of the sheet in offset relation with and upon respectively opposite sides of the line scored therein, when said sheet is resting on said first land with the scored line in coincidence therewith, and means operable to force said base and plate toward one another.

9. The apparatus of claim 8, said first land lying in a first plane, said second and third lands lying in a second plane, and means mounting said plate for guided translation toward and from said base with said planes in parallelism.

10. The apparatus of claim 8, said first land lying in a first plane, said second and third lands lying in a second plane, and means mounting said base and plate for relative translation toward and from one another with said planes relatively inclined at a small angle of the order of a few degrees whereby said second and third lands make initial contact with said sheet at a predetermined point along said scored line to initiate severance at said point.

References Cited by the Examiner

UNITED STATES PATENTS

| | | | |
|---|---|---|---|
| 787,122 | 4/05 | Semmer | 225—2 |
| 1,341,262 | 5/20 | Colburn | 225—96.5 X |
| 1,622,029 | 3/27 | Dovel | 225—104 |
| 1,988,565 | 1/35 | Owen | 225—96.5 |
| 2,219,698 | 10/40 | Owen | 225—2 |
| 2,504,655 | 4/50 | Dallas | 225—2 |
| 2,756,545 | 7/56 | Atkeson | 225—2 |
| 2,839,872 | 6/58 | Cline | 225—96.5 |

WILLIAM W. DYER, JR., *Primary Examiner.*